June 12, 1928.  
C. W. SAALBURG  
1,672,910  
CONTINUOUSLY FLOWING BOTTLES OR THE LIKE  
Filed May 24, 1927  
2 Sheets-Sheet 2
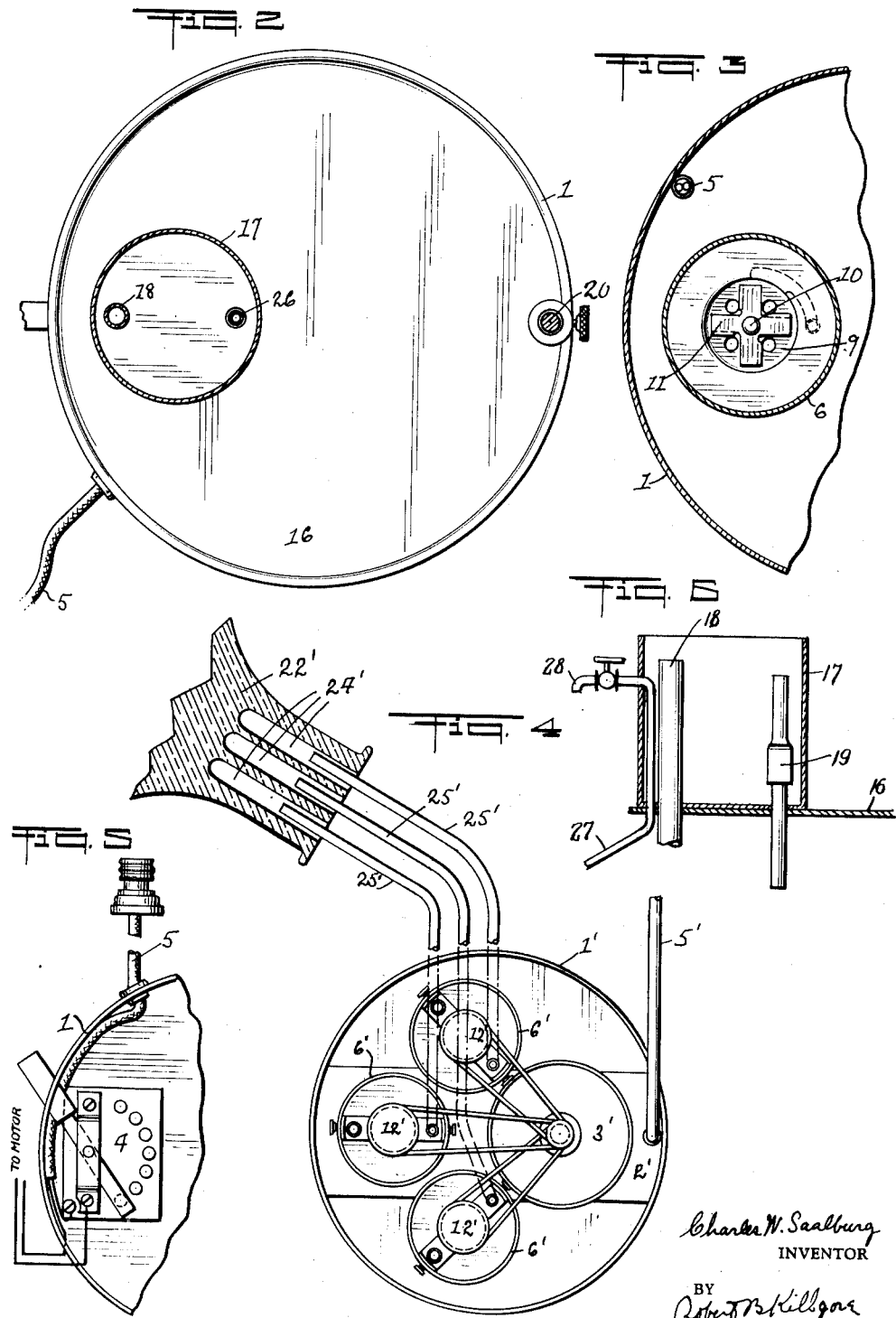
Charles W. Saalburg  
INVENTOR  
BY Robert B Kilgore  
ATTORNEY Patented June 12, 1928.

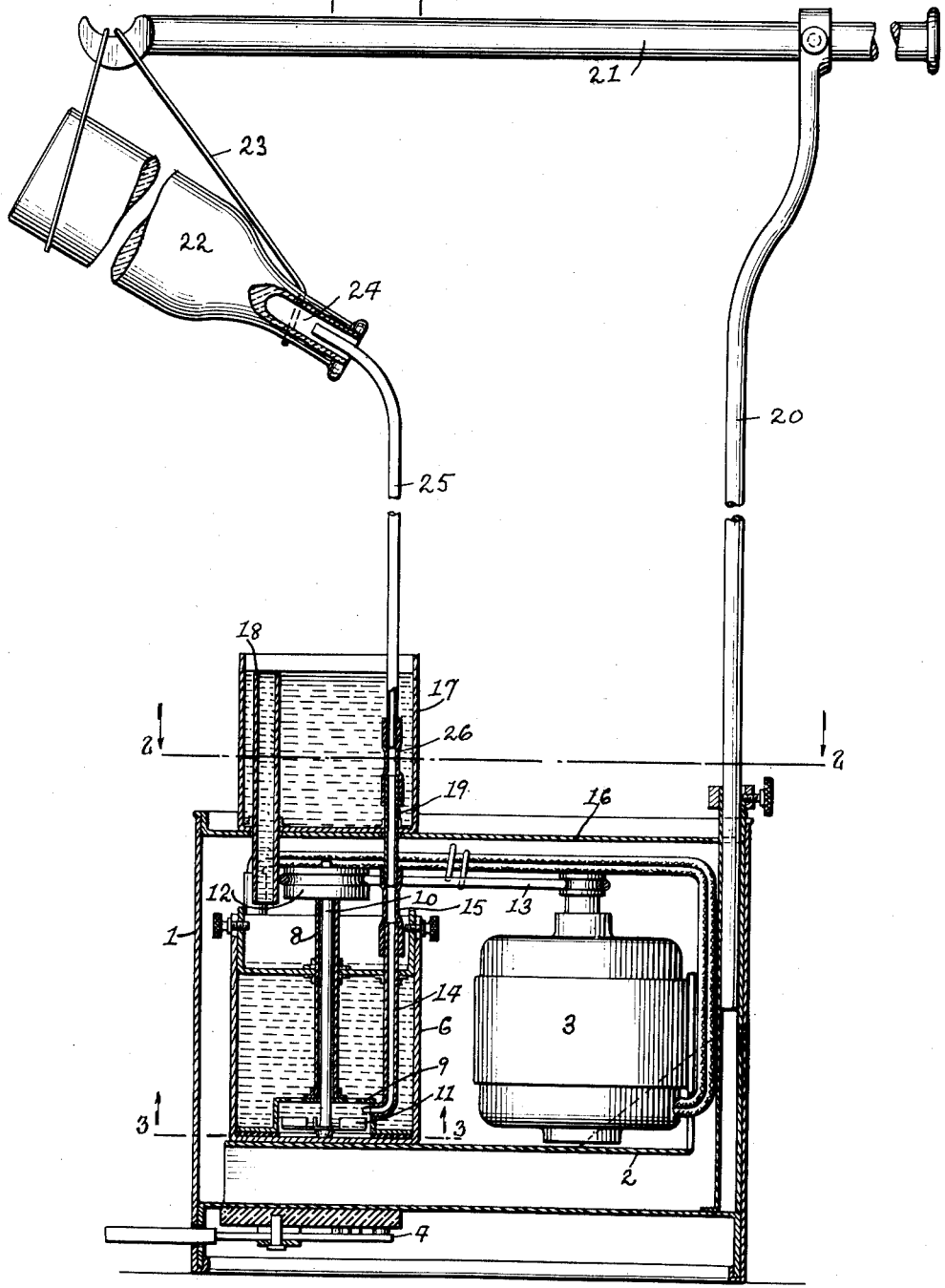

1,672,910

UNITED STATES PATENT OFFICE.

CHARLES W. SAALBURG, OF NEW YORK, N. Y.

CONTINUOUSLY-FLOWING BOTTLE OR THE LIKE.

Application filed May 24, 1927. Serial No. 193,841.

My invention relates to continuously flowing bottles and the like and it is my object to provide simple, portable and efficient means for carrying into effect the invention described in U. S. Letters Patent No. 996,929, dated July 4, 1911, to Hans Kempinski, and owned by me.

In the drawing Fig. 1 is a side view, partly in section, of my improved apparatus; Fig. 2 a view of the structure of Fig. 1 on the line 2—2 thereof; Fig. 3 a fragmentary view of the structure of Fig. 1 on the line 3—3 thereof; Fig. 4 a top view of a modification of the apparatus; Fig. 5 a view of the speed control for the pump; and Fig 6 a view of the receptacle arranged as a dispensing apparatus.

My apparatus comprises a casing 1 adapted to contain and conceal the working parts of the apparatus. Detachably secured within the casing is a bed plate 2 carrying a small electric motor 4, the speed of which is controlled by a rheostat 4. A cord and plug 5 permits the motor's operation from any convenient electric line outlet.

A reservoir 6 is mounted on the bed 2 and contains the main supply of liquid. A bar 7 is detachably secured inside the reservoir 6 below its top and carries a vertical tube 8 which has an enlarged base forming a pump chamber 9 located in the bottom of the reservoir. The top of the pump chamber is perforated as shown in Figs. 1 and 3 so that the liquid in the reservoir can pass freely into the pump. A shaft 10 extends through the tube 8 and carries an impeller pump 11 on its lower end inside the pump chamber 9. The upper end of this shaft carries a pulley 12, outside the reservoir. A belt 13 enables the motor 3 to drive the pump 11.

A supply pipe line consisting of the pipe 14 extends upwardly from the pump chamber 9 and has a rubber coupling 15 at its upper end. A cover 16 closes the casing 1 and conceals the working parts of the apparatus. A receptacle 17 has an overflow pipe 18 extending below its bottom and a supply pipe 19 which also extends below its bottom. Holes are formed in the cover 16 so that when the receptacle is placed on the cover the lower ends of the pipes 18 and 19 project therebelow, the overflow pipe 18 discharging into the reservoir 6 and the lower end of the supply pipe engaging the coupling 15.

A standard 20 is slidably secured to the casing 1 and carries a slidable arm 21 at its upper end. The bottle or other container 22 hangs from the end of the arm 21 from a light chain or cord 23. This bottle or other container has a capsule 24 inserted into its neck and a glass tube 25 with a rubber coupling 26 at its lower end engages the supply pipe 19 with the upper end of the tube extending loosely into the capsule 24. The glass tube end and its coupling are well below the top of the overflow pipe so that they will be concealed by liquid in the receptacle 17.

In operation the reservoir 6 is filled with any desired liquid to about the height of the bar 7 and the receptacle 17 is filled to the overflow pipe. When the pump is running the liquid continuously flows up the supply pipe line 14—15—19—26 and glass tube 25 into the capsule 24 from which it flows back around the outside of the tube 25 into the receptacle 17 and through the overflow pipe 18 to the reservoir 6 where it is pumped back into the supply pipe line.

The proper position of the bottle or other container 22 is adjusted by means of the standard 20, arm 21 and chain or cord 23 so that the liquid in flowing down around the glass tube will completely encircle and hide it.

This conveys the illusion that the bottle is inexhaustible or everflowing and the source of liquid supply is hidden from the observer. The impellar type of pump at the lowest point in the system constantly stirs and agitates the liquid so that no sediment is deposited and the liquid is maintained in constant color and body. The rheostat enables the user to drive the pump at the proper speed to circulate the liquid in use so that the illusion is maintained.

In Fig. 4 I have indicated how a plurality of reservoirs 6'—6'—6' and pumps may be driven from a common motor 3' and a bottle or other container 22' may be provided with a plurality of capsules 24'—24'—24' operating through separate glass tubes 25'—25'—25' into separate containers to produce the illusion of a plurality of streams of different or differently colored, liquids flowing from a single bottle without mingling.

The apparatus is small, light, compact and portable and can be used anywhere with a minimum of liquid and is far superior to that shown in the Kempinski patent upon which it is an improvement.

In Fig. 6 I have shown how the apparatus may be used as a dispensing as well as a display or advertising device. A pipe 27 leads from any suitable source of supply of the liquid to be dispensed, passes through the casing 1 and cover 16 and inside the receptacle 17, in which it is hidden by the liquid therein contained, then out through the side, terminating in the faucet 28. When liquid is to be dispensed the faucet is opened and the liquid passes through the pipe 27 conveying the illusion that it is drawn from the receptacle into which the liquid is continuously flowing without lowering the level therein. The dispensed liquid is always clean and sanitary as it is not exposed to the air until drawn.

I claim:—

1. A continuously flowing bottle device comprising a reservoir, a pump in said reservoir, means for driving said pump, a receptacle located above the reservoir, an overflow pipe in said receptacle draining into said reservoir, a supply pipe extending from said pump through and above said receptacle, means for suspending a container, a container on said suspending means the outlet of which surrounds the upper end of the supply pipe.

2. A continuously flowing bottle device comprising a reservoir, a pump in said reservoir, means for driving said pump, a receptacle located above the reservoir, an overflow pipe in said receptacle draining into said reservoir, a supply pipe extending through and above said receptacle, means for suspending a container, a container on said suspending means, a capsule within the outlet of said container, said capsule surrounding the upper end of the supply pipe.

3. A continuously flowing bottle device comprising a casing, a reservoir in said casing, a pump in said reservoir, means within the casing for driving said pump, a supply pipe line extending upwardly from said pump, a cover for said casing apertured over said reservoir, a receptacle, a supply pipe within said receptacle extending below its bottom and adapted to pass through one of said apertures and engage the reservoir supply pipe, an overflow pipe in said receptacle extending below the bottom thereof and adapted to pass through an aperture in the cover and discharge into said reservoir, a standard on said casing, a container suspended from said standard and a supply pipe one end of which enters the container mouth, the other end of which engages the receptacle supply pipe.

4. A continuously flowing bottle device comprising a plurality of reservoirs, a pump within each of said reservoirs, means for driving said pumps, a plurality of receptacles located above said reservoirs, a supply pipe extending from each of said pumps through its associated receptacle, an overflow pipe in each of said receptacle discharging into its associated reservoir, a container located above said receptacle, a plurality of capsules within the outlet of said container each of which loosely surrounds the upper end of a supply pipe.

5. A continuously flowing bottle device comprising a reservoir, a pump in said reservoir, means for driving said pump, a receptacle located above the reservoir, an overflow pipe in said receptacle draining into said reservoir, a supply pipe extending from said pump through and above said receptacle, means for suspending a container, a container thereon the outlet of which surrounds the upper end of the supply pipe, a dispensing pipe passing inside the receptacle and through the wall thereof below the level of the overflow pipe and a shut-off device on the outer end of said dispensing pipe.

In testimony whereof I have affixed my signature.

CHARLES W. SAALBURG.